June 10, 1930.  P. J. HOFFMAN  1,762,818
VALVE
Filed April 11, 1925   3 Sheets-Sheet 1

INVENTOR
Philip J. Hoffman.
BY and R. S. C. Dougherty
A. B. Reavis
ATTORNEYS

June 10, 1930.   P. J. HOFFMAN   1,762,818
VALVE
Filed April 11, 1925   3 Sheets-Sheet 2

INVENTOR
Philip J. Hoffman
BY
and *R. S. A. Dougherty*
*A. B. Reavis*
ATTORNEYS

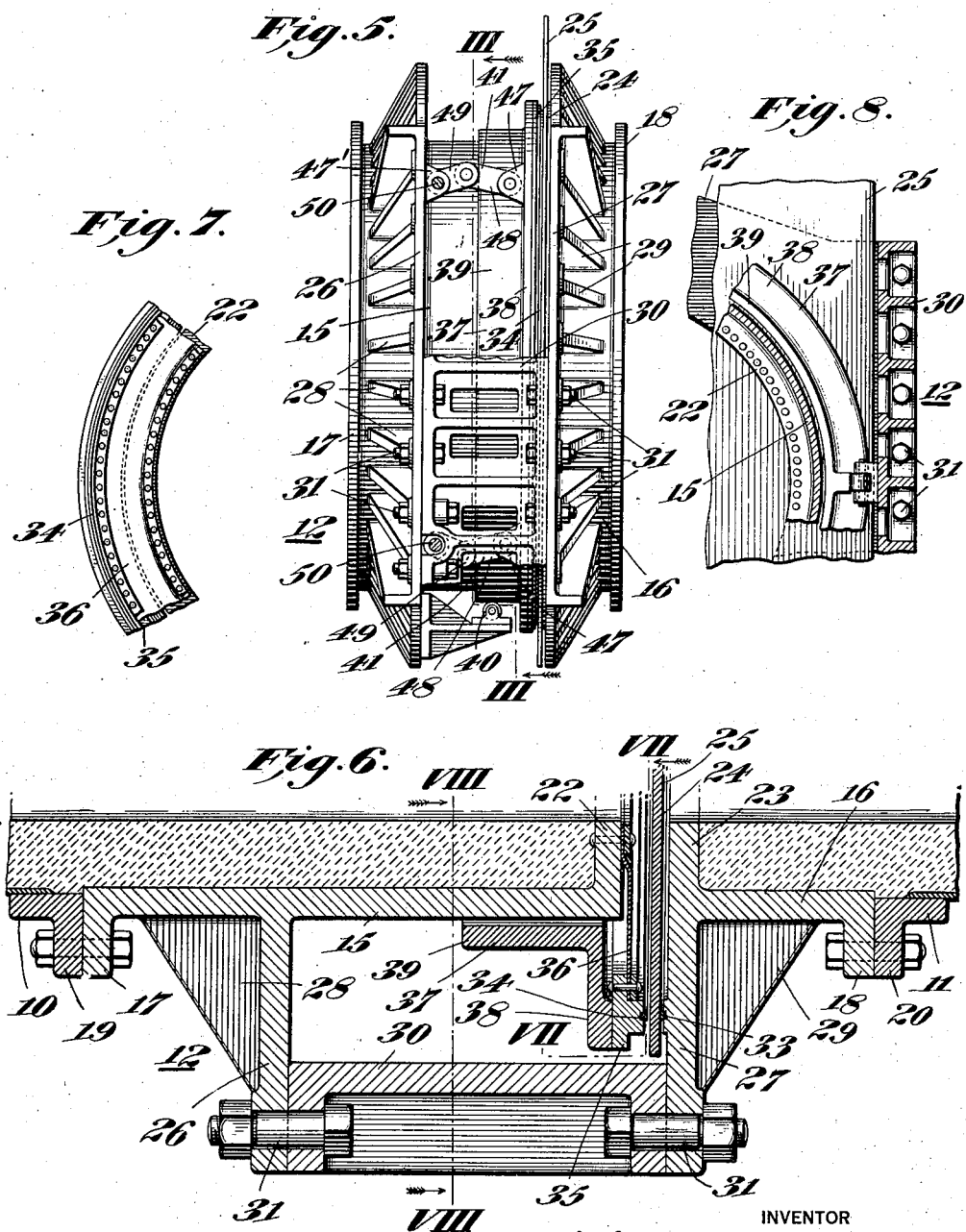

Patented June 10, 1930

1,762,818

UNITED STATES PATENT OFFICE

PHILIP J. HOFFMAN, OF JOHNSTOWN, PENNSYLVANIA, ASSIGNOR TO BETHLEHEM STEEL COMPANY

VALVE

Application filed April 11, 1925. Serial No. 22,350.

My invention relates to valves and more particularly to plate or shutter valves of the type used in pipe line structures for conveying gases such as are evolved in the operation of blast furnaces and the like, and it has for its object to provide a valve of this character which shall be capable of readily operating when required and which shall at all times effect a gas tight seal with respect to the plate or shutter valve member.

Heretofore, valve structures for gas mains have been used involving a sliding apertured plate or shutter together with sealing means cooperating with the shutter in order that the shutter might be sealed to prevent the escape of gas when in either its closed or its open position. In such constructions with which I am familiar, the movable member or element to effect sealing with respect to the shutter has heretofore been made to slide within the gas main proper. This arrangement for sealing the shutter is objectionable for the reason that obstruction of the gas line has a tendency to collect dust and such dust tends to work between the sliding surfaces, thereby preventing the proper operation of the sealing means for the valve. Furthermore, should there be any tendency for the main to sag or distort in the vicinity of the valve structure, there would be a tendency for the operating parts of the sealing means to bind. Accordingly, therefore, I have provided a valve structure, which includes a relatively strong housing and in which the sealing means for the shutter or plate valve is arranged entirely externally of the main, thereby avoiding any tendency for accumulating dust; and the actuating device is so disposed that very little dust will come in contact with it and its mechanical structure and principle of operation are such that it may be readily operated even though dust is present and effect an efficient seal with respect to the shutter or plate valve. Also, the movable parts of the sealing means for the plate valve are of such a character that distortion of the housing structure will not interfere with the proper operation of the sealing means for the valve.

Apparatus made in accordance with my invention is illustrated in the accompanying drawings, forming a part of this application, in which:

Fig. 5 is a side elevational view of the housing and valve structure;

Fig. 6 is a detail sectional view showing the sealing means for the plate valve; and, Figs. 7 and 8 are further detail views.

Figure 1:
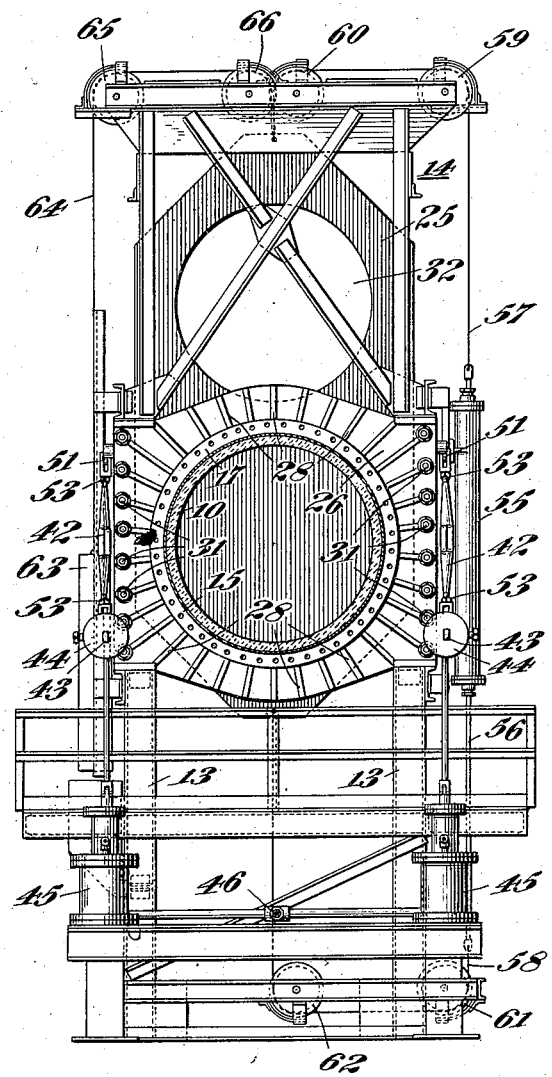
Fig. 1 is an end elevation of my improved valve structure.

Referring now to the drawings for a better understanding of my invention, I show conduit members 10 and 11 connected by housing structure, at 12, the housing structure being supported by any suitable framework including columns 13. The housing structure supports any suitable framework, at 14, for parts of the actuating devices for the plate or shutter valve hereinafter referred to.

Figure 3:
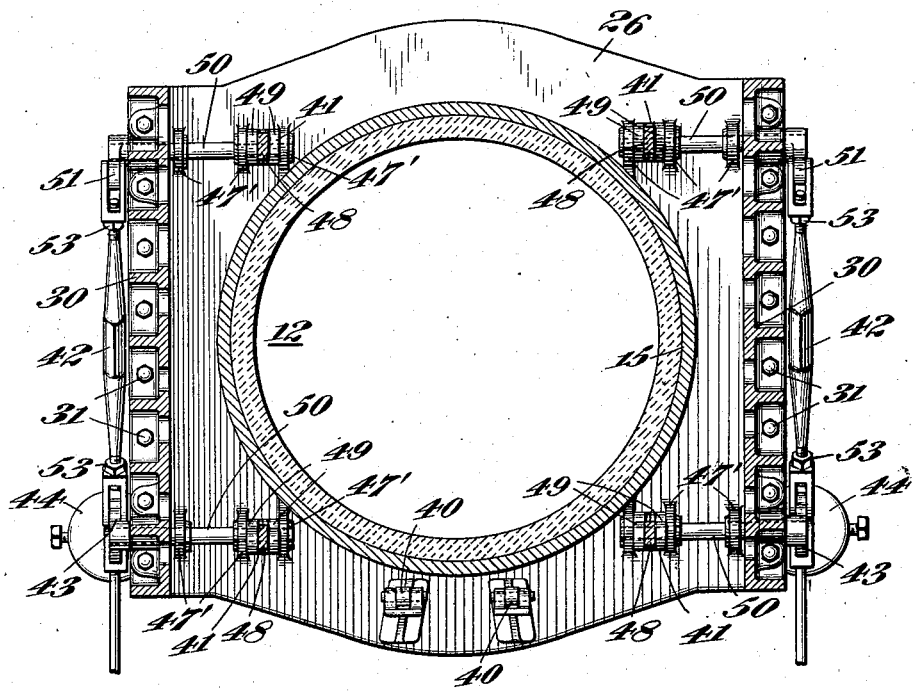
Fig. 3 is a transverse sectional view taken along the line III—III of Fig. 5 and viewed in the direction of the arrows.
Figure 4:
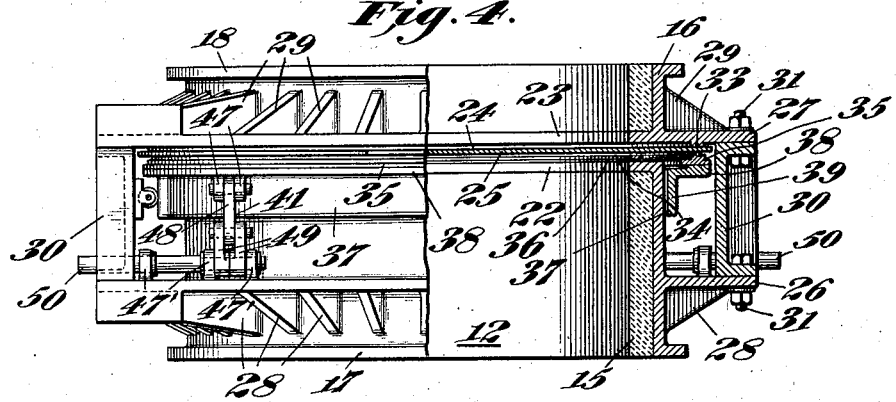
Fig. 4 is a view partly in plan and partly in section of my improved housing and valve structure.

The housing structure is comprised by opposed conduit forming members 15 and 16 (see Fig. 6) having outer flanges 17 and 18, respectively, fastened to the flanges 19 and 20 of the conduits 10 and 11, respectively. The members 15 and 16 are provided with inwardly extending flanges 22 and 23, respectively, which cooperate to define a slot 24 for the shutter or plate valve 25. The conduit forming members 15 and 16 are also provided with externally projecting flanges 26 and 27 reinforced by ribs or webs 28 and 29, respectively. The flange 27 is disposed adjacent to the slot 24 whereas the flange 26 is spaced from the slot. Spacing structures 30 are secured to the flanges 26 and 27 by bolts 31. As may be seen from Fig. 3, two such spacing and reinforcing structures 30 are shown vertically disposed at opposite sides of the housing structure.

The plate valve 25, movable in the slot 24, is of a conventional type. Referring to Fig. 1, it will be seen that the plate valve is provided with an opening 32 which is adapted to align with the main when the valve is open; and, when the valve 25 is raised, as shown in Fig. 1, the lower portion thereof entirely obstructs the main. In either position of the plate valve, it is necessary that the valve shall be effectively sealed to prevent the escape of gas.

The sealing means for the valve 25 is comprised by a gasket 33 carried by the flange 27 and a gasket 34 carried by an adjustable ring 35. The ring 35 is supported in any suitable fluid tight manner with respect to the member 15, for example, in Fig. 6, I show the ring 35 secured to the outer periphery of an annular flexible member 36, the inner edge of the latter member being secured to the member 15. The gaskets 33 and 34 are in opposed relation with the plate or shutter valve 25 interposed therebetween. Accordingly therefore, when the ring 35 is moved toward the flange 27 to grip the plate valve 25 between the gaskets 33 and 34, an effective gas tight seal is provided with respect to the plate valve.

The gasket carrying ring 35 is moved toward the plate valve 25 by means of an annular member 37 having a flange 38 adapted to abut against the ring 35 and a sleeve portion 39. The sleeve portion 39 preferably has a suitable degree of clearance with respect to the member 15 and its weight is supported by rollers 40 shown in Figs. 3 and 5. It will, therefore, be seen that, in operation, the annular member 37 has no tendency to bind with respect to any supporting part and furthermore that it has capacity for transverse relative movement or adjustment with respect to the ring 35 so that the member 37 is a freely floating body and has no effect on the ring 35 except that of abutting said ring in order to effect a gas tight seal.

The means for moving the annuular member 37 longitudinally of the member 15 consists of a number of toggle mechanisms 41 which are connected in pairs by links 42, the connected links and toggles being normally biased in one direction so that the normal tendency of the annular member 37 is to move toward the plate valve 25 to effect a seal. For example, in Figs. 1 and 2, I show the links 42 connected to levers 43, the outer ends of the levers 43 carrying adjustable weights 44.

The levers 43 are moved upwardly in opposition to the weights 44 by any suitable fluid motors 45 connected to a common source of fluid pressure by a conduit 46 containing control valve mechanism, not shown. With the admission of fluid under pressure to the motors 45, the weights 44 are overcome and the link and toggle mechanisms are operated to retract the annular member 37 so that the plate valve 25 may be moved. Upon release of fluid pressure from the motor devices 45, the weights 44 are effective to operate through the lever and toggle mechanisms to move the annular member 37 toward the plate valve in order to grip the plate valve between the gaskets 33 and 34.

Referring now to the linkage and toggle mechanisms more in detail, it will be seen that the annular member 37 is provided with lugs or ears 47 pivotally connected to links 48, the links 48 being pivotally connected to crank portions 49 carried by the upper and lower crank shafts 50 supported in bearings 47' on the flange 26. The crank shafts 50 extend transversely of the housing structure, the outer ends of the upper crank shafts 50 being connected to crank arms 51 and the outer ends of the lower crank shafts being connected to the levers 43 already referred to. The crank arms 51 are pivotally connected to the links 42 and the latter are, in turn, pivotally connected to the levers 43 as already referred to.

Figure 2:
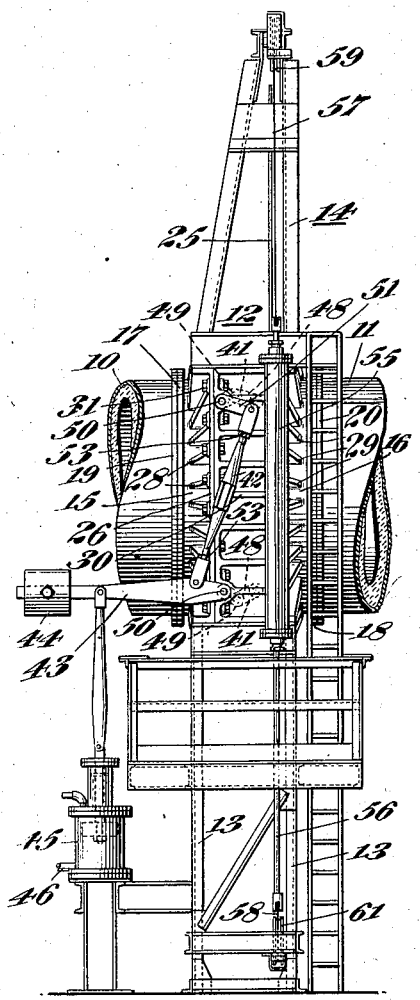
Fig. 2 is a side elevation of the apparatus shown in Fig. 1.

Referring to Figs. 2 and 5, it will be seen that the upper and lower toggle mechanisms are reversed in view of the fact that the upper and lower crank shafts operate in opposite directions.

The links 42 have adjustable connections 53 with respect to the crank arms 51 and have intermediate polygonal portions to facilitate turning when making adjustments. By making proper adjustments between the upper and lower toggle mechanisms, it is assured that the annular member 37 may be moved to apply a substantially uniform pressure throughout the circumferential extent of the gaskets.

The plate valve 25 may be moved in any suitable manner. For example, I show a motor device 55 having an actuated rod element 56, the opposite ends of which are connected to upper and lower cords 57 and 58, the upper cord 57 passing over the sheaves 59 and 60 and being connected to the upper end of the plate valve 25 while the lower cord 58 passes over the sheaves 61 and 62 and is connected to the lower end of the plate valve. A counterweight 63 is connected to a cord 64 passing over the sheaves 65 and 66 and connected to the upper end of the plate valve 25 so that the latter has its weight counter-balanced in all positions.

Apparatus made in accordance with my invention operates as follows: When it is desired to move the plate valve 25, the annular member 37 is retracted by admitting fluid under pressure to the motor devices 45. When the member 37 is retracted, the plate valve 25 may be readily moved; and, in order to facilitate this movement, the annular plate 36 is preferably made springy so that as soon as the member 37 starts to move back the plate member 36 causes the ring 35 to move to release the gasket 34 from the plate 25. Thereupon, the motor device 55 may be rendered effective to move the plate valve 25 to its other position; and, after such movement is effected, fluid under pressure is released from the motor devices 45, permitting the weights 44 to act through the connected toggle mechanisms to move the annular member 37 to effect a gas tight seal with respect to the plate valve.

From the foregoing, it will be apparent that I have provided a valve suitable for gas mains such as are used in connection with blast furnaces in which the operating mechanisms are of a simple character, in which adjustments may be readily made, in which the load of operating parts is entirely removed from the gasket or sealing means and in which the operating parts are of such a character that particles of dust will not affect the operation of the mechanism. Also, it will be noted that the principal operating member for the gasket or sealing means, namely, the annular member 37, is a freely floating body so that the weight thereof is taken off the conduit portion 15, that the operating mechanisms for the annular member are of simple, rugged, and powerful character, and that the operating member 37 has merely an abutment relation with respect to the gasket means. It will, therefore, be apparent that deformation of the housing structure will not affect the operation of the annular member 37 and also any tendency of the annular member 37 to assume an eccentric relation with respect to the main has no effect upon the gasket structure.

Having thus described the invention what I claim as new and desire to secure by Letters Patent is:

1. In a valve, the combination of a housing structure including opposed conduit members defining a slot, a plate valve movable in the slot, means bodily movable externally of one of the conduit members for effecting a gas tight seal of the plate valve with respect to said members, means for normally moving said movable member to sealing position, and means for retracting the movable member to permit the valve to be easily moved.

2. In a valve, the combination of a housing structure including opposed conduit members defining a slot, a plate valve movable in the slot, a member movable externally of one of the conduit members and cooperating with the other conduit member and with the plate valve to effect a gas tight seal of said valve with respect to the conduit members, means for normally moving the movable member to sealing position, means for retracting the movable member, and means for moving the plate valve.

3. A valve for a pipe line comprising a housing structure including opposed conduit portions cooperating to define a transverse slot and externally projecting flange portions connected by a spacing structure, one of said flange portions being disposed adjacent to the slot and the other flange portion being spaced therefrom, a plate valve movable in the slot, a gasket carried by the flange adjacent to the slot, a member movable longitudinally of one of the conduit portions and having a gasket disposed in opposed relation to the first gasket, means for moving the plate valve, and means for normally moving the movable member so as to cause the gaskets to grip the plate valve to effect a gas tight seal.

4. A valve comprising a housing structure including opposed members defining a slot, a plate valve movable in the slot, a gasket carried by one of the members and disposed at one side of the slot, a movable gasket carried by the other member, and means for normally causing the latter gasket to move toward and grip the plate valve, and means for releasing the plate valve.

5. A valve comprising a housing structure including first and second members defining a slot, a plate valve movable in the slot, a flange on the first of said members, a gasket carried by the flange and adapted to contact with one side of the plate, a second gasket for engaging the other side of the plate valve and in opposed relation to the first gasket, an axially movable ring for supporting the second gasket, a fluid tight connection between the ring and the second member, means for normally moving the ring toward the plate valve to grip the latter between the gaskets, and means for rendering the last-named means ineffective.

6. A valve comprising a housing structure including first and second members defining a slot, a plate member movable in the slot, a flange on the first of said members, a gasket carried by the flange and adapted to contact with one side of the plate member, a second gasket for engaging the other side of the plate member and in opposed relation to the first gasket, a ring movable axially for supporting the second gasket, a flexible annular member connected to the ring and to the second member to provide for a fluid tight connection while permitting of axial movement of the ring, means for normally moving the ring toward the plate member to grip the latter between the gaskets, and means for rendering the last-named means ineffective.

7. A valve comprising a housing structure including first and second members defining a slot, an apertured plate movable in the slot, a flange on the first of said members, a gasket carried by the flange and adapted to contact with one side of the plate, a second gasket for engaging the other side of the plate and in opposed relation to the first gasket, a ring movable axially of the members for supporting the second gasket, a fluid tight connection between the ring and the second member, an annular member movable longitudinally of the second member, means for normally moving the annular member toward the ring to abut thereagainst and to cause the latter to move to grip the plate between the gaskets, and means for retracting the annular member.

8. A valve comprising a housing structure including first and second members defining a slot, an apertured plate movable in the slot, a flange on the first of said members, a gasket carried by the flange and adapted to contact with one side of the plate, a second gasket for engaging the other side of the plate and in opposed relation to the first gasket, a ring movable axially of the members for supporting the second gasket, a fluid tight connection between the ring and the second member, an annular member spaced from and movable longitudinally of the second member and adapted to abut against said ring, supporting means for the annular member, a plurality of toggle mechanisms connected to the annular member, and means for operating the toggle mechanisms in opposite directions.

9. A valve comprising a housing structure including first and second members defining a slot, a valve plate movable in the slot, a flange on the first of said members, a gasket carried by the flange and adapted to contact with one side of the valve plate, a second gasket for engaging the other side of the valve plate, a ring movable axially of the members for supporting the second gasket, a fluid tight connection between the ring and the second member, an annular member spaced from and movable longitudinally of the second member and adapted to abut said ring, means for moving the annular member in one direction to cause the ring to move to grip the valve plate between the gaskets, and means for moving the annular member in the other direction in order to release the valve plate.

10. A valve comprising a housing structure including first and second members defining a slot, a valve plate movable in the slot, a flange on the first of said members, a gasket carried by the flange and adapted to contact with one side of the valve plate, a second gasket for engaging the other side of the valve plate, a ring movable axially of the members for supporting the second gasket, a fluid tight connection between the ring and the second member, an annular member including a sleeve portion of larger internal diameter than the external diameter of said second member and a flange portion for abutting said ring, means for supporting the annular member out of contact with the second member, means for moving the annular member to cause the ring to move to grip the valve plate between the gaskets, and means for retracting the annular member in order that the valve plate may be released.

11. A valve comprising a housing structure including first and second members defining a slot, a valve plate movable in the slot, a flange on the first of said members, a gasket carried by the flange and adapted to contact with one side of the valve plate, a second gasket for engaging the other side of the valve plate, a ring movable axially of the members for supporting the second gasket, a fluid tight connection between the ring and the second member, a longitudinally movable annular member having an abutment portion adapted to abut against said ring, means for supporting the annular member out of contact with the second member, and means for moving the annular member in opposite directions.

12. A valve comprising a housing structure including first and second members defining a slot, a vlave plate movable in the slot, a flange on the first of said members, a gasket carried by the flange and adapted to contact with one side of the valve plate, a second gasket for engaging the other side of the valve plate, a ring movable axially of the members for supporting the second gasket, a fluid tight connection between the ring and the second member, a longitudinally movable annular member having an abutment portion adapted to abut against said ring, means for supporting the annular member out of contact with the second member, toggle mechanisms connected to the annular member, weight means for rendering the toggle mechanisms effective to move the annular member to cause the ring to grip the valve plate between the gaskets, and fluid pressure responsive means for moving the toggle mechanisms in the opposite direction to retract the annular member.

13. A valve comprising a housing structure including first and second members defining a slot, a valve plate movable in the slot, a flange on the first of said members, a gasket carried by the flange and adapted to contact with one side of the valve plate, a second gasket for engaging the other side of the valve plate, a ring movable axially of the members for supporting the second gasket, a fluid tight connection between the ring and the second member, a longitudinally movable annular member having an abutment portion adapted to abut against said ring, means for supporting the annular member out of contact with the second member, pairs of upper and lower shafts carried by the second member, crank arms carried by the shafts, links for connecting the crank arms to the annular member, other crank arms carried by the pairs of shafts, links for connecting the last-named crank arms of the respective pairs of shafts, lever arms carried by the lower crank arms, weights carried by the lever arms, and fluid pressure responsive devices having the actuated elements thereof connected to the lever arms to operate the latter in opposition to the weights.

14. A valve comprising a housing structure including first and second members defining a slot, a valve plate movable in the slot, a flange on the first of said members, a gasket carried by the flange and adapted to contact with one side of the valve plate, a second gasket for engaging the other side of the valve plate, a ring movable axially of the members for supporting the second gasket, a fluid tight connection between the ring and the second member, a longitudinally movable annular member having an abutment portion adapted to abut against said ring, means for supporting the annular member out of contact with the second member, pairs of upper and lower shafts carried by the second member, crank arms carried by the shafts, links for connecting the crank arms to the annular member, other crank arms carried by the pairs of shafts, adjustable links for connecting the last-named crank arms of the respective pairs of shafts, lever arms carried by the lower crank arms, weights carried by the other ends of the lever members and fluid pressure responsive devices having the actuated elements thereof connected to the lever arms to operate the latter in opposition to the weights.

15. A valve comprising a housing structure including first and second members defining a slot, a valve plate movable in the slot, a flange on the first of said members, a gasket carried by the flange and adapted to contact with one side of the valve plate, a second gasket for engaging the other side of the valve plate, a ring movable axially of the members for supporting the second gasket, a fluid tight connection between the ring and the second member, a longitudinally movable annular member having an abutment portion adapted to abut against said ring, means for supporting the annular member out of contact with the second member, pairs of upper and lower shafts carried by the second member, crank arms carried by the shafts, links for connecting the crank arms to the annular member, other crank arms carried by the pairs of shafts, adjustable links for connecting the last-named crank arms of the respective pairs of shafts, means for normally biasing the connected levers and crank shafts for movement to cause the ring to move and engage its gasket with the valve plate, and means for rendering the last-named means ineffective.

16. In a valve, opposed conduit members defining a slot, a plate valve movable in the slot, a member bodily movable for effecting a gas tight seal of the plate valve with respect to said members, means for normally moving said movable member to sealing position, and means for retracting the movable member.

17. In a valve mechanism for a pipe line, the combination of a plate valve movable transversely of the line, valve clamping means movable longitudinally of the line, means for exerting a constantly acting force in one direction operatively connected to the valve clamping means to move the same bodily in a direction to seal the valve to the line, and means for releasing the seal against the action of the constantly acting force.

18. In a valve mechanism for a pipe line, the combination of a valve plate movable transversely of the line, means bodily movable relative to the line for clamping the valve plate to the line, means acting automatically to move the clamping means into clamping engagement with the valve plate, and means under the control of an operator for moving the clamping means out of clamping engagement.

19. A plate valve comprising a valve body having a valve plate passageway therein, a valve plate movably mounted in said passageway, a rigid non-movable valve-seat mounted on one side of said valve plate passageway, a movable seat mounted on the other side of said passageway, means normally tending to force said movable seat against said valve plate and to force said plate into engagement with said rigid non-movable seat to form a tight joint between said valve-seats and said valve plate, and mechanical means for releasing said movable valve-seat.

In testimony whereof I hereunto affix my signature this 3rd day of April, 1925.

PHILIP J. HOFFMAN.